G. W. McKEE.
PROPORTIONAL FUEL MIXER.
APPLICATION FILED NOV. 12, 1917.
1,404,211.
Patented Jan. 24, 1922.
2 SHEETS—SHEET 2.
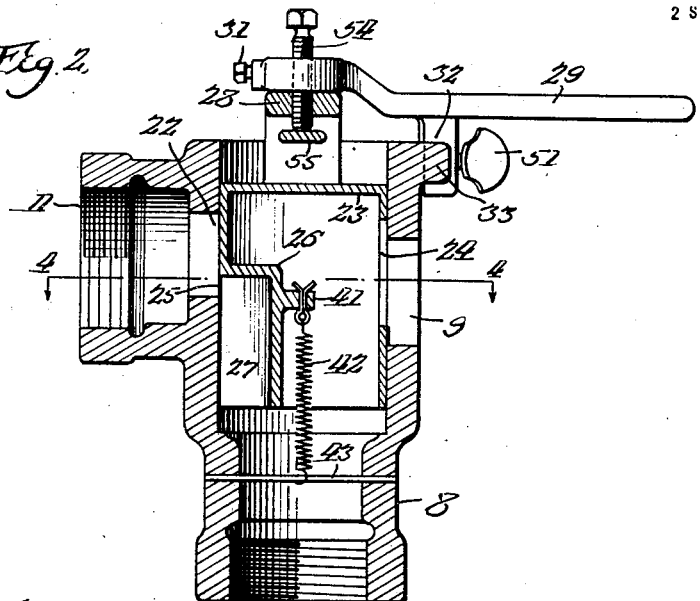
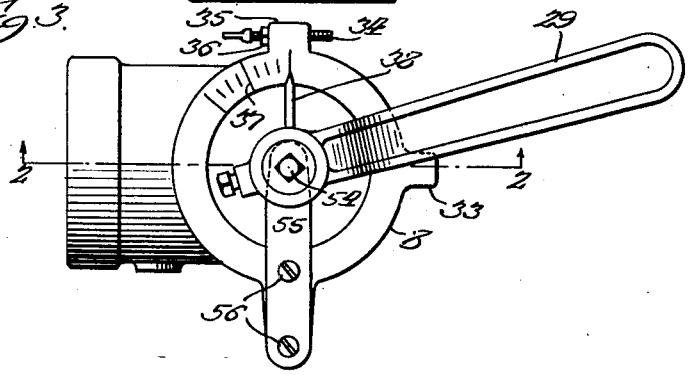
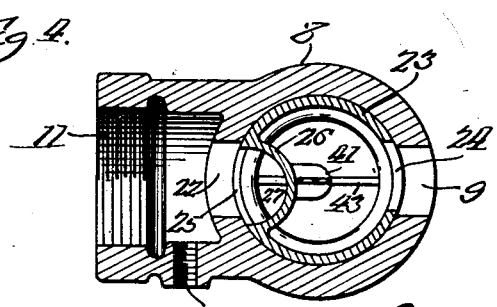
Inventor:
Garnet W. McKee
By Pond & Wilson
Attys.

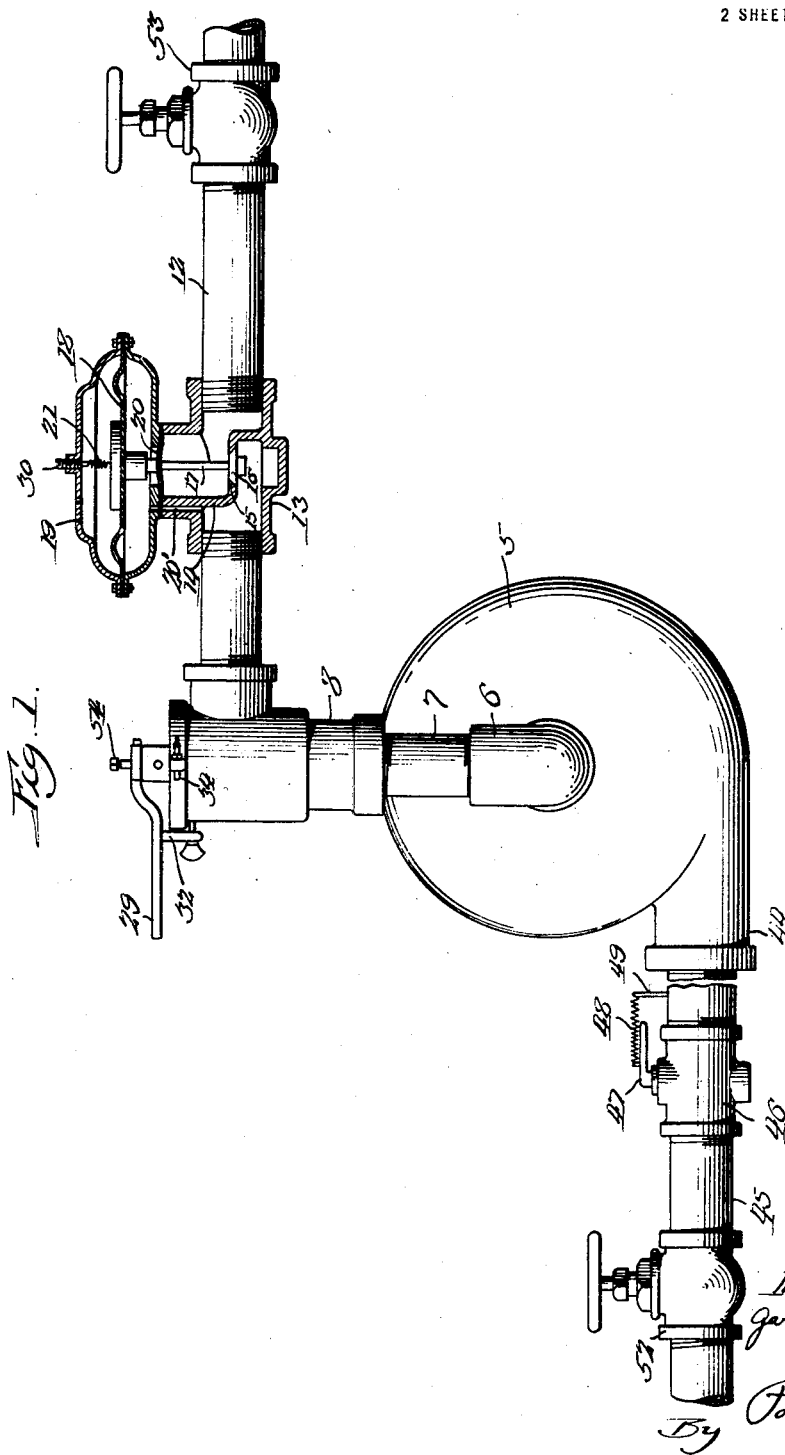

UNITED STATES PATENT OFFICE.

GARNET W. McKEE, OF ROCKFORD, ILLINOIS.

PROPORTIONAL FUEL MIXER.

1,404,211.  Specification of Letters Patent.  Patented Jan. 24, 1922.

Application filed November 12, 1917. Serial No. 201,540.

*To all whom it may concern:*

Be it known that I, GARNET W. McKEE, a subject of the King of Great Britain, residing at Rockford, in the county of Winnebago and State of Illinois, have invented certain new and useful Improvements in Proportional Fuel Mixers, of which the following is a specification.

This invention relates to proportional fuel mixers, that is, apparatus for producing from illuminating gas and air a mixture of the proper proportions to give a maximum amount of heat when delivered under pressure to a burner for heating furnaces of various characters.

The customary practice at present in vogue is to deliver air under pressure produced by a blower, into a flowing stream of gas and to cause the air and gas to be mixed by an injector action. The resultant pressure secured at the burner, however, is far below that produced by the blower and, furthermore, the inequalities in the pressure of the gas result in a combustive mixture of varying proportions of air and gas so that the resultant heating flame secured is not at all uniform.

I am aware that it has heretofore been proposed to mix the air and gas ahead of the blower so that the resultant mixture produced would be delivered to the burners at a higher and, therefore, more desirable pressure, but very serious accidents have been occasioned by this method as the result of a flare-back or explosion in the blower caused by closing down the air and gas supply so that the rate of delivery is less than the rate of travel of the flame, thereby causing the flame to flare-back into the mixer. These accidents, some of which have been very serious in their results, have caused the abolishment of this latter method of mixing in proper proportions ahead of the mixer and a return to the previously described method now employed, which, as before stated, is unsatisfactory because of the fluctuations and variations in the flames produced at the burners, and because of the impossibility of obtaining high pressures of the mixture at the burner.

One of the primary objects of my present invention is to provide a proportional mixer which will deliver at high pressures to the burners a mixture of air and gas of absolutely uniform proportions. The high burner pressure secured and the uniformity of the mixture result in the highest efficiency of the apparatus.

Another object of my invention is the provision of a device which in combination with the other elements of my apparatus causes the gas to be delivered to the mixer proper at a uniform pressure which is substantially equal to the atmospheric pressure at which the air enters the mixer.

A further feature of my invention resides in the provision of mechanism whereby the relative proportions of air and gas delivered to the mixer may be varied and regulated at will, and whereby the volumes of air and gas delivered may be simultaneously diminished or increased as occasion requires, without affecting their relative proportions.

Still another feature of my invention is the provision in the combination of a shut-off valve between the mixer and the burners which must remain either completely open or completely closed so that partial closing of the valve which might permit a flare-back into the mixer under certain conditions is prohibited.

Other objects and many of the attendant advantages of my invention should be readily appreciated by those skilled in the art by reference to the following description when considered in connection with the accompanying drawings. Referring to the drawings—

Fig. 1 is a side elevation of one embodiment of my invention, certain parts being shown in section;

Fig. 2 is a longitudinal sectional view taken on a vertical medial plane through the controlling valve and taken on the line 2—2 of Fig. 3;

Fig. 3 is a plan view of the valve shown in Fig. 1; and

Fig. 4 is a transverse sectional view taken on the line 4—4 of Fig. 2.

By reference to the drawings, and particularly Fig. 1 thereof, it will be observed that reference character 5 indicates generally a centrifugal blower fan of any preferred type, which agitates and thoroughly mixes the air and gas admitted thereto. Coincident with the axis of rotation of the fan the supply pipe 6 enters the fan casing. The air and gas are supplied to this intake pipe through a connection 7, from the valve casing 8, which is provided as shown in Figs. 2 and 4 with an air intake port 9 and a lateral coupling stud 11, to which the gas supply pipe 12 is connected.

In order to secure a combustible mixture of uniform proportions it is essential that the air and gas be both delivered to the mixer at uniform pressures without fluctuations. As is well known the gas pressures in any city main are subject to considerable fluctuation as the result of the amount of gas used and as a result of varying conditions at the gas plant, and with a view of reducing these varying pressures to a constant and uniform pressure before delivery to the mixer I have introduced into the gas supply pipe 12 a pressure regulating device which will now be described.

This device, as will be evident from Fig. 1, comprises a body or casing 13 interposed in the gas supply pipe and provided with a partition wall 14 which is equipped with a valve seat 15. A valve 16 adapted to fit this seat is connected with a stem 17 which is suspended at its upper end from a flexible diaphragm 18 disposed entirely across the chamber formed by the casing 19 and is attached to a smaller diaphragm 20 substantially equal in area to the valve 16 so that the gas pressure will have no tendency to move this valve in either direction. The chamber above the diaphragm 18 is open to the atmosphere. A very light spring 21 secured to the diaphragm 18, and to an adjustable screw 30 in the top of the casing 17, counterbalances the weight of the valve and stem. A bleed passage 20' establishes communication between the suction side of the partition 14 and the compartment below the diaphragm 18. The valve 16 will be normally closed irrespective of the amount of gas pressure. The suction created by the blower 5, however, creates a partial vacuum in that portion of the gas supply pipe 12 connecting the valve casing 8 and the casing 13, and acting through the passage 20' upon the diaphragm 18, causes the valve 16 to partially open, thus admitting gas at practically atmospheric pressure to the mixer. It will be manifest that by this device I am enabled at all times to deliver gas to the mixer at substantially atmospheric pressure and that this pressure is constant and uniform irrespective of the gas pressure in the main gas supply pipe.

Since air is drawn in through the port 9 at atmospheric pressure and gas is drawn in through the port 22 at substantially atmospheric pressure it will be manifest that these two fluids are delivered to the mixer at constant and equal pressures, which result in a combustive mixture of uniform proportions.

Since it is frequently desirable to increase or diminish the flow of air and gas to the mixer I have provided within the casing 8 a valve which, as will be apparent from Figs. 2 to 4 inclusive, consists of a hollow body 23 adapted to fit within the casing 8, provided at one side with a port 24 adapted to register with the port 9 and at its opposite side with a port 25 adapted to register with the port 22. An arcuate wall 26 disposed around port 25 and extending downwardly from the port 25 deflects the inflowing gas and provides a passage 27 down which the gas travels toward the lower end of the casing 8 where it meets and unites with the air flowing in through the ports 9 and 24. The top of the valve body 23 is provided with an upwardly projecting boss 28 to which an operating handle 29 is fixedly secured by a setscrew 31. By means of this handle the valve body may be oscillated between fully open position, in which a lug 32 projecting downwardly from the handle 29 engages a fixed stop 33 on the casing 8, and an adjustable abutment 34 consisting of a setscrew threaded through a boss 35 located 90° from the boss 33 and locked in adjusted position by a lock nut 36. When the handle is turned to the position shown in Fig. 3 the ports 24 and 25 are in full register with their respective ports 9 and 22. When the handle is swung until the boss 32 engages the adjustable stop 34 the ports 24 and 25 are both in only slight registration with their respective inlet ports, so that only a small quantity of air and gas will be admitted. This construction prohibits the entire closing off of the air and gas, thereby insuring a flow to the burners at a rate in excess of the rate of flame travel and consequently eliminating all danger of flareback from the burners. The valve, of course, may be set at any point between the abutments 33 and 34, and in order that the operator may accurately gauge the position of the valve at any time the top of the casing 8 is provided with a series of indications 37 over which a pointer 38, projecting laterally from the boss 28, travels. By glancing at the position of the pointer the extent to which the valve is open at any time may be readily observed. The valve may be locked in any adjusted position against accidental displacement, by means of a setscrew 51 threaded through the lug 32 and adapted to clamp against the wall of the casing 8.

Different grades of gas or different purposes for which the apparatus is to be employed may require a variation in the relative proportions of air and gas included in the mixture, and I have therefore made provision for regulating the relative proportions of air and gas delivered to the mixer, consisting of an adjustable setscrew 54 threaded downwardly through the horizontally projecting portion of the boss 28 into engagement with a supporting bar 55 which is fixed to the top of the casing 8 by screws 56 or otherwise and projects directly beneath the screw 54 by which the weight of the valve member 23 is supported. By adjusting this screw 54 the valve may be raised or lowered. Raising of the valve will increase the size of the port 25 and diminish the size of the port 24, and lowering of the valve will correspondingly diminish the port 25 and increase the effective area of the port 24. Thus by raising or lowering the valve the relative proportions of air and gas admitted may be regulated and controlled to a fine degree of nicety, and it should be noted that this regulation of the proportions affects in no way the opening or closing of the valve by means of the handle 29, as the opening and closing movements resulting from the manipulation of this handle takes place so as to open and close the ports 25 simultaneously and equal amounts irrespective of the vertical adjustment of the valve.

While I have shown the valve casing 8 in the present instance as located in a vertical position it obviously might be used in an inclined or a horizontal position equally as well, and in order that no accidental withdrawal or partial withdrawal of the valve may occur I have provided the wall 26 with a lateral boss 41 to which the upper end of a contractile spring 42 is attached, the lower end being connected with a transverse pin or bar 43, with the result that this spring pulls longitudinally upon the valve to maintain the supporting screw 54 at all times in engagement with the supporting bar 55.

From the mixer 5, in which the air and gas are thoroughly mixed, the mixture is delivered under pressure through the discharge throat 44 into the delivery pipe 45 leading to one or more burners. In the delivery pipe and, if more than one burner is used, preferably in the branch leading to each burner I mount a shut-off valve 46 provided with the usual handle 47. A contractile spring 48 attached at one end to the handle and at its other to the fixed pin 49 is disposed at such an angle with respect to the handle that it will hold the valve either in the position shown in Fig. 1 or in entirely open position when the handle is swung through an arc of substantially 180°. In other words, the direction of force of the spring 48 is slightly at one side of the axis of the valve so that as soon as the handle is moved past dead center the spring automatically and quickly closes the valve, before the explosion wave can travel to the valve, thereby precluding a partial or slow closing of the valve which might result in a flare-back to the mixer. In the branch leading to each burner I also install a regulating valve 52 by which the flame may be regulated, but these regulating valves are so constructed that they can never be entirely closed off or closed far enough to cause a flare-back. They are solely regulating valves and the quick closing valves 46 must be used for shut-off purposes. The gas supply pipe 12 is equipped with an ordinary shut-off valve 53 which shuts off the gas when the apparatus is not in use. The coupling stud 11 is preferably provided with a tapped aperture 57 for the attachment thereto of a pressure gauge or register.

It is believed that from the foregoing my invention and many of its inherent advantages will be fully understood, and it should be manifest that various changes in the size, shape and relative proportions of the various parts may be resorted to without departing from the spirit of the invention as set forth in the following claims.

I claim:

1. The combination of a suction mixer adapted to deliver the mixture under pressure, means for delivering air and gas to said mixer including a gas delivery means, means for causing the gas to be delivered from said gas delivery means at a uniform pressure substantially equal to the air pressure, and means whereby the relative proportions of air and gas delivered may be regulated.

2. The combination of a suction mixer adapted to deliver the mixture under pressure, means for delivering air and gas to said mixer including a gas delivery means, means for causing the gas to be delivered from said gas delivery means at substantially atmospheric pressure, and means whereby the relative proportions of air and gas delivered to said mixer may be regulated.

3. The combination of a suction mixer, a supply pipe therefor, a casing connected to said supply pipe and having provision for the admission of air and gas thereto, a gas supply pipe connected to said casing, means disposed in said gas supply pipe for causing the gas to be delivered to said casing at a uniform pressure substantially equal to atmospheric pressure, means within the casing for proportionally increasing or diminishing the flow of both air and gas to the casing, and a device whereby said last mentioned means may be adjusted to vary the proportions of air and gas admitted to the casing.

4. The combination of a suction mixer adapted to deliver a mixture under pressure, a pipe for delivering air and gas to said mixer, means for supplying gas to said pipe at substantially atmospheric pressure irrespective of the pressure in the gas main, means for increasing and diminishing the flow of air and gas to said pipe without varying their relative proportions, and means for varying the relative proportions of air and gas delivered without varying the total quantity delivered.

GARNET W. McKEE.